United States Patent
Yi

(10) Patent No.: US 10,728,077 B2
(45) Date of Patent: Jul. 28, 2020

(54) METHOD AND APPARATUS FOR PERFORMING RANDOM ACCESS PROCEDURE IN NB-IOT CARRIER IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/754,585

(22) PCT Filed: Sep. 2, 2016

(86) PCT No.: PCT/KR2016/009832
§ 371 (c)(1),
(2) Date: Feb. 22, 2018

(87) PCT Pub. No.: WO2017/039374
PCT Pub. Date: Mar. 9, 2017

(65) Prior Publication Data
US 2018/0249509 A1  Aug. 30, 2018

Related U.S. Application Data

(60) Provisional application No. 62/213,613, filed on Sep. 2, 2015, provisional application No. 62/234,019, filed
(Continued)

(51) Int. Cl.
*H04W 4/70* (2018.01)
*H04L 29/08* (2006.01)
(Continued)

(52) U.S. Cl.
CPC ...... *H04L 27/2659* (2013.01); *H04J 11/0069* (2013.01); *H04L 67/12* (2013.01);
(Continued)

(58) Field of Classification Search
CPC ............... H04W 4/70; H04W 72/1289; H04W 74/0833; H04L 67/12
See application file for complete search history.

(56) References Cited

U.S. PATENT DOCUMENTS

| 5,467,373 A | 11/1995 | Ketterling |
| 2008/0080463 A1 | 4/2008 | Stewart et al. |

(Continued)

FOREIGN PATENT DOCUMENTS

| CN | 103828457 | 5/2014 |
| CN | 104254997 | 12/2014 |

(Continued)

OTHER PUBLICATIONS

PCT International Application No. PCT/KR2016/009832, Written Opinion of the International Searching Authority dated Dec. 1, 2016, 2 pages.

(Continued)

*Primary Examiner* — Kodzovi Acolatse
*Assistant Examiner* — Farhad Ali
(74) *Attorney, Agent, or Firm* — Lee Hong Degerman Kang & Waimey

(57) ABSTRACT

A method and apparatus for performing a random access procedure in a narrowband internet-of-things (NB-IoT) carrier in a wireless communication system is provided. A user equipment (UE) transmits a random access preamble to a network, receives a random access response from the network, determines resources of scheduled uplink (UL) transmission, and performs the scheduled UL transmission to the network. A number of repetitions and a number of tones for the scheduled UL transmission are determined by the random access preamble.

5 Claims, 19 Drawing Sheets

Related U.S. Application Data on Sep. 28, 2015, provisional application No. 62/235,586, filed on Oct. 1, 2015, provisional application No. 62/238,096, filed on Oct. 6, 2015, provisional application No. 62/234,128, filed on Oct. 18, 2015, provisional application No. 62/263,740, filed on Dec. 7, 2015, provisional application No. 62/271,999, filed on Dec. 28, 2015, provisional application No. 62/276,950, filed on Jan. 10, 2016, provisional application No. 62/039,406, filed on Mar. 16, 2016.

(51) Int. Cl.

| | | |
|---|---|---|
| *H04W 72/12* | (2009.01) | |
| *H04W 74/08* | (2009.01) | |
| *H04L 27/26* | (2006.01) | |
| *H04W 48/16* | (2009.01) | |
| *H04J 11/00* | (2006.01) | |
| *H04W 24/10* | (2009.01) | |
| *H04W 36/24* | (2009.01) | |
| *H04W 48/18* | (2009.01) | |
| *H04W 4/80* | (2018.01) | |
| *H04W 76/27* | (2018.01) | |
| *H04W 72/14* | (2009.01) | |

(52) U.S. Cl.
CPC .............. *H04W 4/70* (2018.02); *H04W 4/80* (2018.02); *H04W 24/10* (2013.01); *H04W 36/24* (2013.01); *H04W 48/16* (2013.01); *H04W 48/18* (2013.01); *H04W 72/1289* (2013.01); *H04W 72/14* (2013.01); *H04W 74/0833* (2013.01); *H04W 76/27* (2018.02)

(56) References Cited

U.S. PATENT DOCUMENTS

| | | |
|---|---|---|
| 2012/0058772 A1 | 3/2012 | Kazmi et al. |
| 2013/0003668 A1 | 1/2013 | Xiao et al. |
| 2013/0053049 A1 | 2/2013 | Al Housami |
| 2013/0070822 A1 | 3/2013 | Takahashi |
| 2013/0083749 A1 | 4/2013 | Xu et al. |
| 2013/0089067 A1 | 4/2013 | Ji et al. |
| 2013/0182680 A1 | 7/2013 | Choi et al. |
| 2014/0029568 A1 | 1/2014 | Wang et al. |
| 2015/0245378 A1 | 8/2015 | Kim et al. |
| 2016/0286507 A1 | 9/2016 | Yang et al. |
| 2017/0064685 A1 | 3/2017 | Rico Alvarino et al. |
| 2017/0273113 A1* | 9/2017 | Tirronen ................ H04W 4/70 |
| 2018/0160453 A1* | 6/2018 | Lee ........................ H04W 72/04 |
| 2018/0206271 A1 | 7/2018 | Chatterjee et al. |

FOREIGN PATENT DOCUMENTS

| | | |
|---|---|---|
| EP | 1906686 | 4/2008 |
| WO | 2014003436 | 1/2014 |
| WO | 2014073940 | 5/2014 |
| WO | 2015056924 | 4/2015 |
| WO | 2015069000 | 5/2015 |

OTHER PUBLICATIONS

Qualcomm Incorporated, "Narrow band OFDMA—Text proposal for TR," 3GPP TSG GERAN #65, GP-150118, Mar. 2015, 33 pages.
State Intellectual Property Office of the People's Republic of China Application U.S. Appl. No. 201680050741.8, Office Action dated Nov. 19, 2018, 7 pages.
U.S. Appl. No. 15/750,491, Office Action dated Dec. 21, 2018, 17 pages.
U.S. Appl. No. 15/756,495, Office Action dated Nov. 23, 2018, 19 pages.
PCT International Application No. PCT/KR2016/009829, International Search Report dated Nov. 28, 2016, 3 pages.
PCT International Application No. PCT/KR2016/009827, International Search Report dated Dec. 12, 2016, 3 pages.
LG Electronics, "Further details on narrowbands and frequency hopping", 3GPP TSG RAN WG1 Meeting #82, R1-154227, Aug. 2015, 10 pages.
Panasonic, "MTC Narrowband definition and collision handling", 3GPP TSG RAN WG1 Meeting #82, R1-153960, Aug. 2015, 8 pages.
Lenovo, "Consideration of narrowband definition for MTC UEs", 3GPP TSG RAN WG1 Meeting #82, R1-154496, Aug. 2015, 5 pages.
Huawei, et al., "On the specification and use of narrowbands", 3GPP TSG RAN WG1 Meeting #82, R1-153750, Aug. 2015, 7 pages.
Ericsson LM, "On NB M2M Cell Search Mechanism", 3GPP TSG GERAN Meeting #65, GP-150143, Mar. 2015, 15 pages.
Ericsson LM, et al., "Narrowband LTE—Cell search design", 3GPP TSG GERAN Meeting #67, GP-150783, Aug. 2015, 10 pages.
U.S. Appl. No. 15/750,491, Office Action dated Jul. 30, 2019, 15 pages.
U.S. Appl. No. 15/750,491, Final Office Action dated Apr. 8, 2019, 10 pages.

* cited by examiner

METHOD AND APPARATUS FOR PERFORMING RANDOM ACCESS PROCEDURE IN NB-IOT CARRIER IN WIRELESS COMMUNICATION SYSTEM

CROSS-REFERENCE TO RELATED APPLICATIONS

This application is the National Stage filing under 35 U.S.C. 371 of International Application No. PCT/KR2016/009832, filed on Sep. 2, 2016, which claims the benefit of U.S. Provisional Application No. 62/213,613, filed on Sep. 2, 2015, 62/234,019, filed on Sep. 28, 2015, 62/235,586, filed on Oct. 1, 2015, 62/238,096, filed on Oct. 6, 2015, 62/243,128, filed on Oct. 18, 2015, 62/263,740, filed on Dec. 7, 2015, 62/271,999, filed on Dec. 28, 2015, 62/276,950, filed on Jan. 10, 2016, and and 62/309,406, filed on Mar. 16, 2016, the contents of which are all hereby incorporated by reference herein in their entirety.

BACKGROUND OF THE INVENTION

Field of the Invention

The present invention relates to wireless communications, and more particularly, to a method and apparatus for performing a random access procedure in a narrowband internet-of-things (NB-IoT) carrier in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

SUMMARY OF THE INVENTION

The present invention provides a method and apparatus for performing a random access procedure in a narrowband internet-of-things (NB-IoT) carrier in a wireless communication system. The present invention further discusses an initial access procedure for the narrowband (NB) UE/MTC UE/cellular internet-of-things (CIoT) UE.

In an aspect, a method for performing a random access procedure in a narrowband internet-of-things (NB-IoT) carrier in a wireless communication system is provided. The method includes transmitting a random access preamble to a network, receiving a random access response from the network, determining resources of scheduled uplink (UL) transmission, and performing the scheduled UL transmission to the network. A number of repetitions and a number of tones for the scheduled UL transmission are determined by the random access preamble.

In another aspect, a user equipment (UE) in a wireless communication system is provided. The UE includes a memory, a transceiver, and a processor, coupled to the memory and the transceiver, that controls the transceiver to transmit a random access preamble to a network, controls the transceiver to receive a random access response from the network, determines resources of scheduled uplink (UL) transmission, and controls the transceiver to perform the scheduled UL transmission to the network. A number of repetitions and a number of tones for the scheduled UL transmission are determined by the random access preamble.

The random access procedure in the NB-IoT carrier can be performed efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
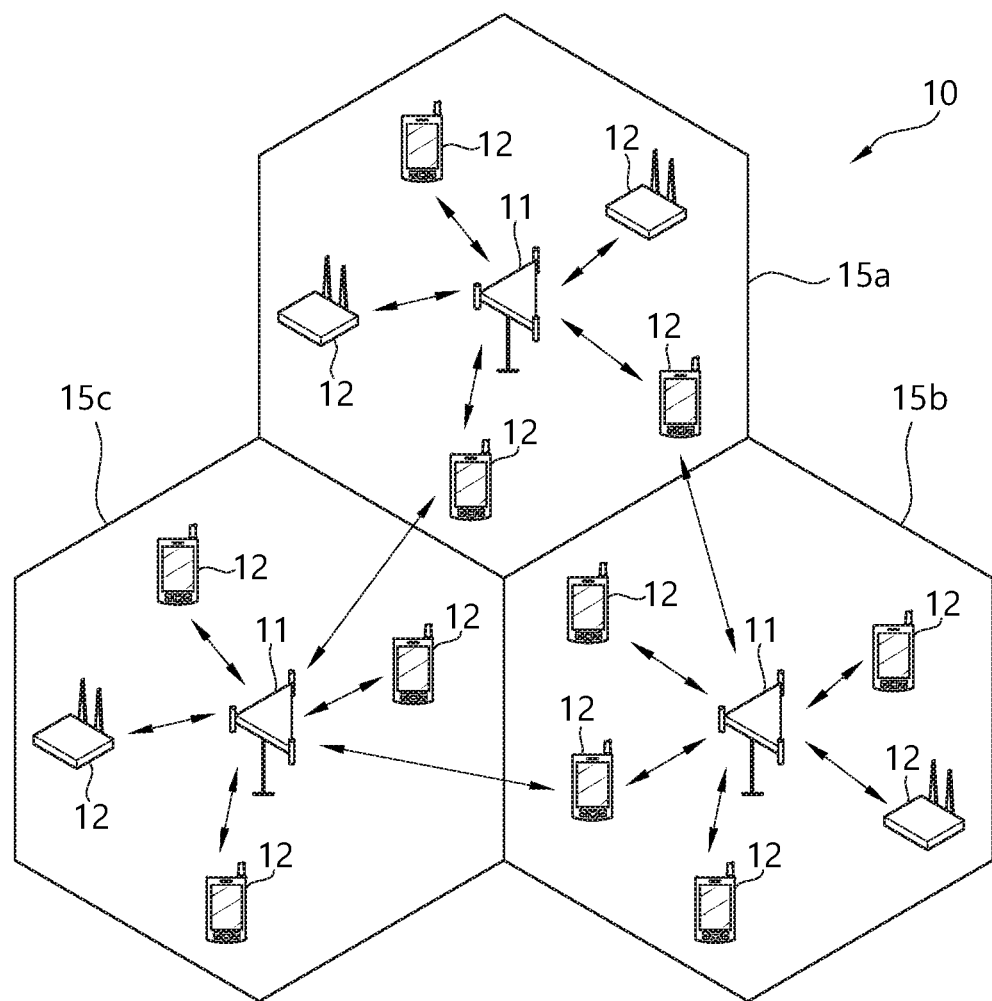
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11.

In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
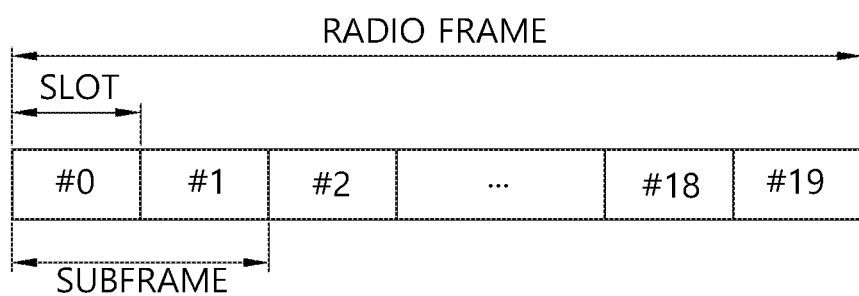
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
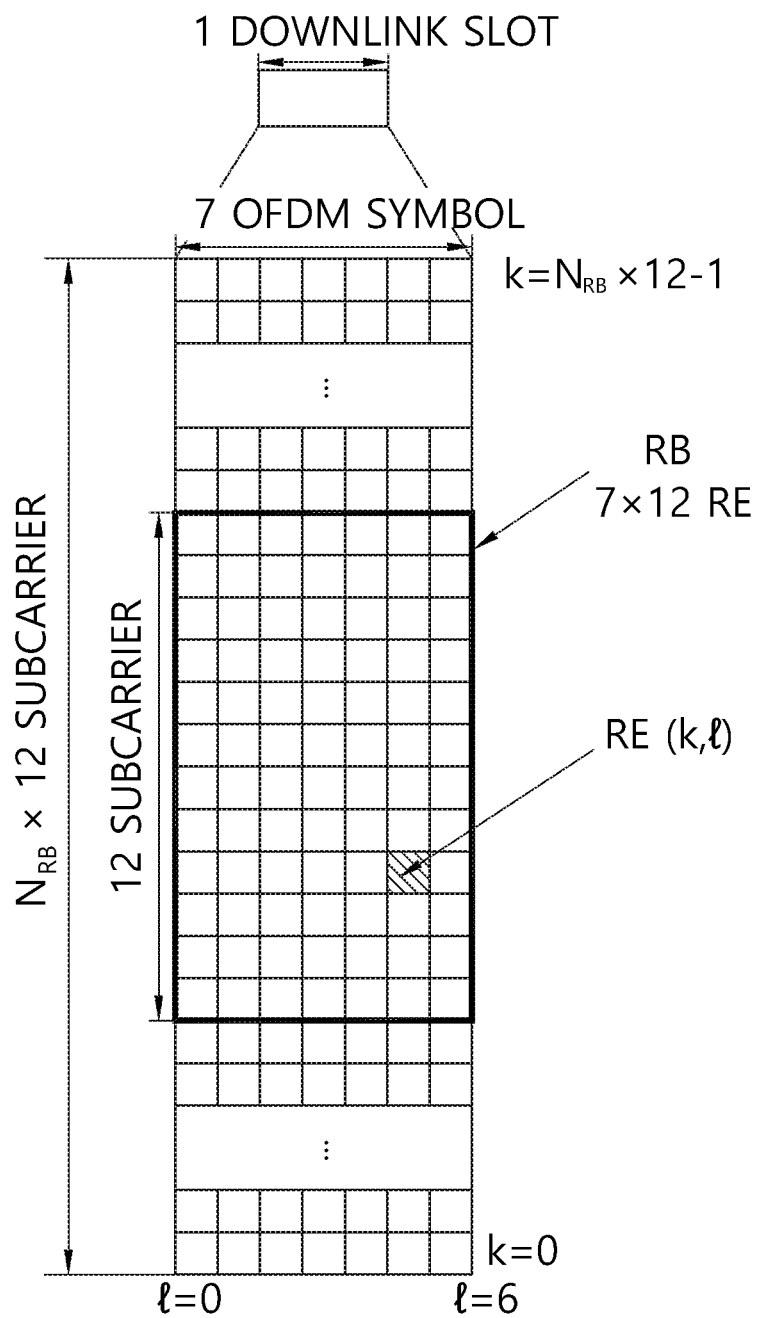
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
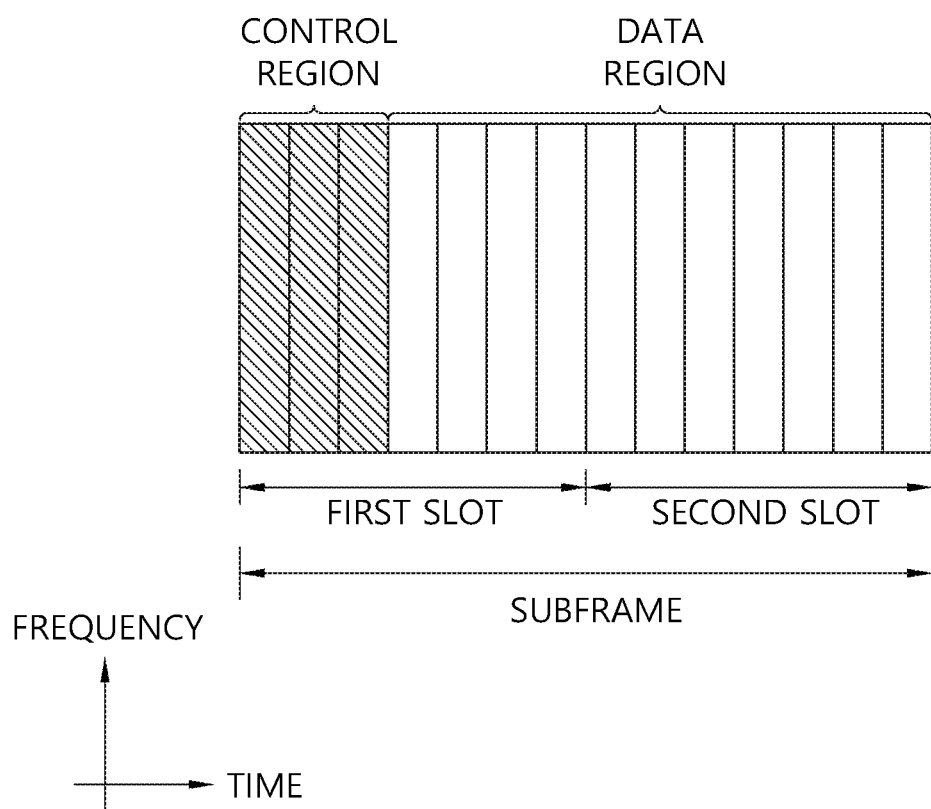
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
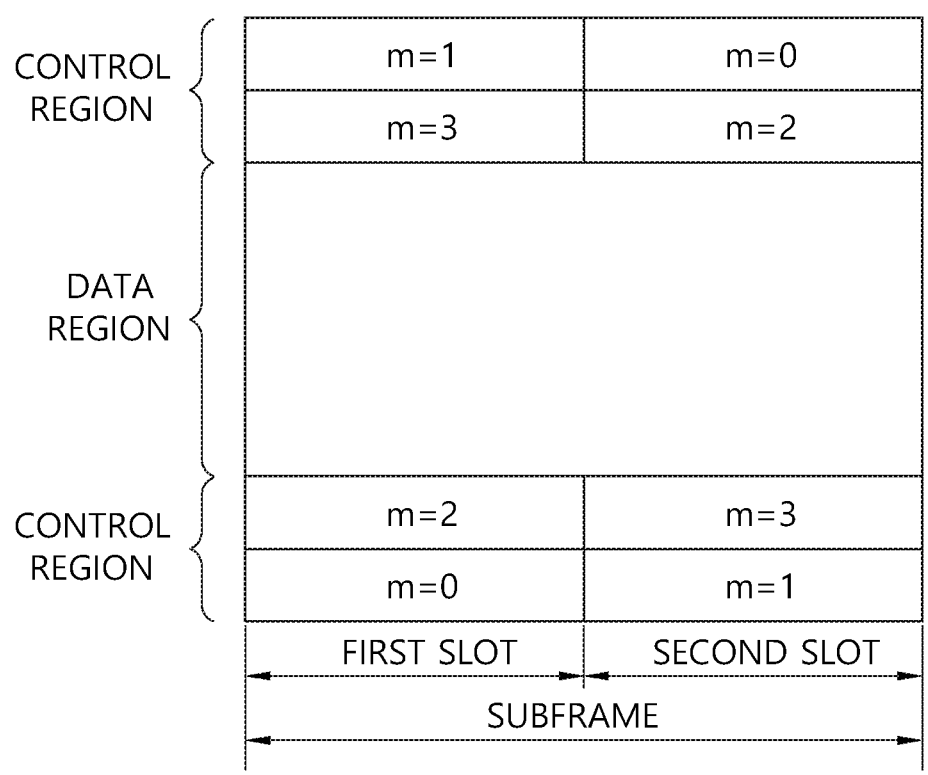
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Low complexity UEs are targeted to low-end (e.g. low average revenue per user, low data rate, delay tolerant) applications, e.g. some machine-type communications (MTC). A low complexity UE has reduced Tx and Rx capabilities compared to other UE of different categories. Among low complexity UEs, a bandwidth reduced low complexity (BL) UE may operate in any LTE system bandwidth but with a limited channel bandwidth of 6 PRBs (corresponding to the maximum channel bandwidth available in a 1.4 MHz LTE system) in DL and UL. A BL UE may a transport block size (TBS) limited to 1000 bit for broadcast and unicast.

When a UE performs initial access towards a specific cell, the UE may receive master information block (MIB), system information block (SIB) and/or radio resource control (RRC) parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDSCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

Hereinafter, a MTC UE, a UE requiring coverage enhancement (CE), a low cost UE, a low end UE, a low complexity UE, a narrow(er) band UE, a small(er) band UE, a new category UE, a BL UE, or narrowband internet-of-things (NB-IoT) UE, or NB-LTE UE may have the same meaning, and may be used mixed. Or, just a UE may refer one of UEs described above. Further, in the description below, a case where system bandwidth of available cells is larger than bandwidth that new category narrowband UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Figure 6:
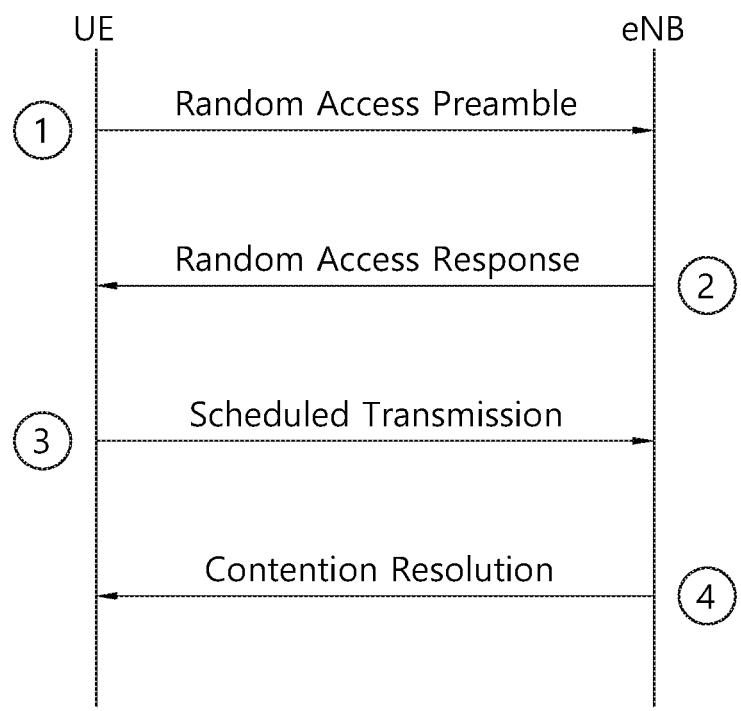
FIG. 6 shows a contention based random access procedure in 3GPP LTE.

FIG. 6 shows a contention based random access procedure in 3GPP LTE. The four steps of the contention based random access procedures are as follows:

(1) Random access preamble on random access channel (RACH) in uplink: The random access preamble may be called as different names, i.e. preamble, physical random access channel (PRACH) preamble or message 1 (Msg 1). There are two possible groups defined and one is optional. If both groups are configured, the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

(2) Random access response (RAR) generated by media access control (MAC) on DL-SCH: The RAR may be called as different names, i.e. message 2 (Msg 2). The characteristics of the RAR may be as follows.

Semi-synchronous (within a flexible window of which the size is one or more TTI) with message 1;
No HARQ;
Addressed to RA-RNTI on PDCCH;
Conveys at least RA-preamble identifier, timing alignment information for the primary timing advance group (pTAG), initial UL grant and assignment of temporary C-RNTI (which may or may not be made permanent upon Contention Resolution);
Intended for a variable number of UEs in one DL-SCH message.

(3) First scheduled UL transmission on UL-SCH: The first scheduled UL transmission may be called as different names, i.e. message 3 (Msg 3). The characteristics of the message 3 may be as follows.

Uses HARQ;
Size of the transport blocks depends on the UL grant conveyed in RAR.
For initial access, the message 3 conveys the RRC connection request generated by the RRC layer and transmitted via common control channel (CCCH), and conveys at least non-access stratum (NAS) UE identifier but no NAS message.
For RRC connection re-establishment procedure, the message 3 conveys the RRC connection re-establishment request generated by the RRC layer and transmitted via CCCH.
After handover, in the target cell, the message 3 conveys the ciphered and integrity protected RRC handover confirm generated by the RRC layer and transmitted via dedicated control channel (DCCH), and conveys the C-RNTI of the UE (which was allocated via the handover command). Further, the message 3 includes an uplink buffer status report when possible.
For other events, the message 3 conveys at least the C-RNTI of the UE.

(4) Contention resolution on DL: The contention resolution message may be called as different names, i.e. message 4 (Msg 4). The characteristics of the message 4 may be as follows.

Early contention resolution shall be used, i.e. eNB does not wait for NAS reply before resolving contention;
Not synchronized with message 3;
HARQ is supported;
Addressed to the temporary C-RNTI on PDCCH for initial access and after radio link failure, or the C-RNTI on PDCCH for UE in RRC_CONNECTED.
HARQ feedback is transmitted only by the UE which detects its own UE identity, as provided in message 3, echoed in the contention resolution message;
For initial access and RRC connection re-establishment procedure, no segmentation is used (RLC-TM).

Hereinafter, a method for performing a random access procedure in an NB-IoT carrier according to an embodiment of the present invention is described by various aspects of the present invention. For the random access procedure in the IoT carrier, the contention based random access procedure in 3GPP LTE may be used basically. When the contention based random access procedure in 3GPP LTE is used, it is possible that multiple UEs are accessing the network at the same time. Thus, some mechanisms to distribute load to schedule corresponding Msg3, retransmission of Msg3, and Msg4 may be necessary. While one mechanism to distribute load is to multiplexing different UEs by time division multiplexing (TDM) manner, this issue may become more critical in a single NB-IoT carrier. When multiple NB-IoT carrier(s) are configured, it is possible to configure different NB-IoT carrier for different UEs. In the description below, it may be assumed that k1 downlink basic resource unit (DL-BRU) is available in frequency domain, and k2 uplink basic resource unit (UL-BSU) is available in frequency domain at a given time. As one cell may have more than one NB-IoT carrier or schedule NB-IoT control signal/data in more than one PRB in the system bandwidth including guard band, it may be necessary to define basic resource unit in time and frequency domain, which is called BSU. One BRU may consist of k subcarriers and m subframes in frequency and time domain. For example, k=12 and m=6. Further, it may be assumed that S number of UEs may be multiplexed in one preamble transmission. Depending on the transmission, S may be same as k2 or larger or small than k2.

1. RAR Resource Determination

Though RAR may be scheduled via control signal, the single RAR may be transmitted in the assigned resource. For determining the assigned resource for the RAT, simple mapping rule between preamble index and resource index may be considered. For example, the network may configure a cell-specific or a coverage level specific gap for one RAR resource, which includes both RAR window and the possible repetitions. The UE may determines its RAR window as (preamble index*gap) to (preamble index*(gap+1)) starting from the last subframe of PRACH repetition. If the network wants to configure less resource for RAR, the network may also divide the overall resource by dividing factor D, such that (ceil (preamble index/D)*gap) to (ceil (preamble index/D)*(gap+1)) is used for RAR window to monitor RAR reception. The gap may be a repetition number required to transmit one RAR. In other words, RAR resource may be multiplexed by TDM manner among UEs sharing the same frequency based on preamble index. For example, if k1 DL-BRU is available in frequency domain, the first frequency resource may schedule RAR for UEs transmitted preamble index divided by k1. The value floor (preamble index/k1) may be used to determine index of RAR resource rather than utilizing preamble index directly. In other words, RAR resources may be divided in time and frequency domain based on preamble index or subcarrier index used in preamble transmission.

The size of RAR may be fixed such that blind decoding is not necessary. In this case, control channel may carry information on RAR which always includes one RAR for one UE. If the size of RAR is different depending on whether contention based or contention free random access procedure is used, in NB-IoT, the contention free random access procedure may always be used where a UE selects preamble index based on UE ID. Alternatively, the contention based random access procedure may always be used. The benefit of contention free random access procedure is that the amount of data to be transmitted in Msg 3 can be reduced. For example, a UE may use preamble index of (UE ID % maximum number of preambles). To handle contention resolution, a UE may transmit only floor (UE ID/maximum number of preambles). However, the drawback of the contention free random access procedure is that UEs colliding in one resource may collide in other PRACH resources. For randomization, instead of utilizing UE ID directly, some randomization function based on system frame number (SFN) or PRACH resource configuration may be considered. For example, (UE ID*SFN % maximum number of preambles) may be used. In this case, floor (UE ID*SFN) value may be transmitted in Msg 3. Some other randomization function may also be considered.

For starting subframe of RAR repetition, a set of fixed starting subframes may be used. When k1 DL-BRU is available in frequency domain for RAR, RAR may be transmitted in different frequency location where a UE expects to receive RAR in a frequency based on preamble index or subcarrier index used in preamble transmission. One RAR may multiplex multiple UEs in one frequency.

2. Msg 3 Resource Determination

If RAR resource is distributed, Msg 3 transmission may also be distributed. For this, the starting subframe of Msg 3 transmission (and/or retransmission) may be indicated by UL grant carried in RAR. If RAR of multiple UEs are multiplexed and transmitted in the same PDSCH, distribution of Msg 3 timing may become challenging. Accordingly, the starting subframe of Msg 3 transmission per each preamble may be indicated by UL grant carried in each RAR.

Alternatively, Msg3 transmission timing may be determined based on the index in RAR transmission. For example, a gap may be carried in RAR header in each RAR. For example, when gap value is g and the index of UL grant in PDSCH is i, the Msg 3 transmission timing may be (g*i)+4. In other words, the Msg 3 transmission timing may be determined based on the gap configured in PDSCH carrying multiple RARs. If the network supports multiple NB-IoT carriers, different timing and NB-IoT carrier may be selected. Or, m value may be the number of available tone(s) used for PUSCH transmission. For example, if there are m available NB-IoT carriers or m disjoint tone(s) usable by Msg 3 transmission, the m value may also be indicated in PDSCH transmitting multiple RARs. A UE may select NB-IoT carrier based on preamble index % m or the index of RAR in the PDSCH message (e.g., floor (index/m)) and the Msg 3 transmission timing may be determined as mentioned in above (sequential timing based on index carried in RAR). However, the gap may not be indicated when the UE can use the number of repetitions or duration of Msg 3 transmission as the gap.

In essence, when only one or a few NB-IoT carriers are available, to allow UE multiplexing, flexible time-domain multiplexing may be necessary. However, time-domain multiplexing may be able to operate with low overhead. Thus, implicit mapping between preamble and resource used for preamble may be used to determine the time and/or frequency resources of successive message.

Further, the number of tones and the number of repetitions may be determined by preamble transmission. For example, if coverage class 1 is used, repetition number R1 may be used, and if coverage class 2 is used, repetition number R2 may be used, and so on. The number of tones may also be different depending on the coverage level. Alternatively, single tone may always be used. More specifically, the number of repetitions may be determined predefined manner or configured by physical broadcast channel (PBCH)/SIB. Frequency location selection may be indicated in UL grant carried in RAR. Alternatively, the tone may be selected based on RAR index if a UE can determine RAR index. In other words, in a NB-IoT UL carrier, depending on RAR index, a UE may select a tone index to transmit Msg 3. If different number of tones are used per coverage class, a UE may assume that the same coverage class UEs will always be multiplexed at the same time, thus, a tone index may be selected considering that multiple tones are used in each transmission (e.g. total number of tones/k*RAR index where k is the number of tones used for Msg 3 transmission).

When multiple RARs are multiplexed, RAR index may be the order within one RAR transmission. If separate RAR is transmitted, RAR index may be the resource index where RAR has been transmitted. When more than one DL NB-IoT carrier is used to transmit RAR, the same corresponding UL NB-IoT carrier may be assumed for Msg 3 transmission. Alternatively, UL NB-IoT carrier for Msg 3 may be determined implicitly based on the resource index among multiple resources of RAR in each DL NB-IoT carrier. For example, resource index 0 may be mapped to the first UL NB-IoT carrier in which the tone used for Msg 3 is determined by the index of DL NB-IoT carrier where RAR has been transmitted. This tends to multiplex Msg 3 transmission timing aligned among multiple UEs in one UL NB-IoT carrier. Alternatively, UL NB-IoT carrier may be indicated per each RAR transmission.

Alternatively, to align Msg 3 transmission timing among multiple UEs (if RARs are multiplexed in one message, it may be aligned among multiple UEs), Msg 3 transmission timing may be defined by the last RAR resource rather than actual RAR resource which schedules Msg 3. In other words, starting subframe of Msg 3 transmission may be semi-statically configured or implicitly derived from the resource sets of RAR.

3. Msg 3 Retransmission Resource Determination

Msg 3 retransmission resource needs to be differentiated from Msg 3 initial transmission resource. For this, UL resources of Msg 3 initial transmission and Msg 3 retransmission may be separated from each other. In this case, additional timing determination on Msg3 retransmission may not be necessary. Alternatively, for UL scheduling in general, starting subframe may be dynamically indicated. If UL resources are separated from each other, the available tone(s) usable for Msg 3 initial and/or retransmission may be semi-statically configured. The SIB may indicate that the first X tones are used for Msg 3 initial transmission and the following X2 tones are used for Msg 3 retransmission. In this case, in terms of resource allocation, resource may be indicated based on X tones for Msg 3 initial transmission and X2 tones for Msg 3 retransmission. Similarly, UL tones may be separate among different coverage classes and/or different initial access and unicast transmission. To minimize DCI overhead, for each purpose, the number of resource blocks or subcarrier tones may be indicated by SIB. For example, if there are three NB-IoT UL carriers and each NB-IoT carrier has Y tones, total 3*Y tones may be divided between Msg 3 initial/retransmission, and/or between initial access/unicast and/or among different coverage class.

3. Msg 4 Resource Determination

To minimize the waiting time of a UE, if necessary, starting subframe of Msg 4 transmission may be indicated in DCI dynamically. To minimize the bit size requirement of starting subframe, some implicit mechanism may also be used. For example, if search space is expanded to time domain, starting subframe of control channel (e.g. NB-IoT PDCCH (N-PDCCH)) may be used to determine the starting subframe of Msg 4 transmission. For example, if there are possibly K candidates within K*R subframes (where R is the repetition number), the starting subframe from 0 to K−1 in which actual N-PDCCH has been scheduled may be used to determine starting subframe of Msg 4 transmission. For example, if i is used for N-PDCCH within [0, . . . K−1], then the starting subframe of Msg 4 transmission may also be defined as (R_PDSCH*i)+k, where k is the necessary timing between the last N-PDCCH and the first of PDSCH repetition. In other words, the starting subframe of Msg 4 transmission may be determined based on the search space candidate index.

This design may allow multiplexing of maximum K number of UEs in one window and scheduling maximum K number of PDSCHs in the following subframes. In terms of selecting a DL NB-IoT carrier for Msg 4 transmission, it may be either semi-statically (UE-specific or cell-specific) configured or implicitly associated with UL NB-IoT carrier in which Msg 3 initial transmission or Msg3 retransmission has been transmitted. The tone index in which Msg 3 initial transmission or Msg 3 retransmission has been transmitted may indicate the time resource within one NB-IoT DL carrier to indicate the potential resource where Msg 4 transmission can be transmitted to minimize UE power consumption. Since there may be small number of PDSCH scheduling in one window scheduled by K control channels, some offset value may be indicated in DCI or in a common signaling. This offset value may be used as the following equation (R_PDSCH*(i−offset)+k.

As PDSCH may be scheduled to multiple NB-IoT carriers, the number of NB-IoT carriers usable by PDSCH may also be indicated which then can be used to shorten the starting subframe. However, multiple NB-IoT carriers may also be used for control channel transmission. Thus, for PDSCH, it may not be necessary to consider the number of NB-IoT carriers.

Depending on the number of NB-IoT carriers and the number of UEs intended to be supported in one window, the network may configure at least one of the following parameters.

Value K: K may indicate how many UEs will be multiplexed within one window. Optionally, the periodicity and offset of one window may also be configured.

Repetition R: Multiple R may be supported, and in this case, maximum R value may be configured. A UE may monitor multiple (up to K) search space where within maximum R. there may be multiple candidates of different R values. For example, when K=10, maximum R=16, then the UE may search repetition 4, 8 as well. In this case, the UE may search control message in one window up to 30 times (4, 8, 16 per each K=0, . . . , 9)

In terms of DCI transmission, one DCI may contain information for multiple UEs. In this case, each UE may be configured with index, and the UE may find the corresponding information. For this, information may be mapped based on C-RNTI implicitly. A UE may be configured with group RNTI (G-RNTI), and CRC of DCI may be masked with G-RNTI. Each UE may finds the corresponding information as (C-RNTI % m), where m is the number of available information pairs in the transmitted DCI. For example, a group DCI may just indicate narrowband or frequency location and starting subframe offset (e.g. frequency location is 2 bits, starting subframe offset is 2 bits). In this case, a DCI may be size of 32 which may contain 8 UE's scheduling information. One bit may be necessary per each field to indicate UL or DL grant. Or, different group DCI may be used per DL/UL grant. When G-RNTI is used, each candidate may be further associated implicitly with group to further minimize UE power consumption.

Overall, resource block assignment implicitly tied with UE-RNTI or some other semi-statically configured parameters may restrict some flexibility. To minimize the scheduling constraints, more than one G-RNTI may be allocated. The UE may search multiple candidates with multiple GRNTIs. In this case, some confusion may occur if different UEs with different C-RNTI shares partially or fully G-RNTIs. To minimize this, an index within a group may be semi-statically configured. Or, an index within a group may be implicitly determined by floor (C-RNTI/G-RNTI) or floor (C-RNTI/a value). The index may not be large and the network may need to ensure non-collision among UEs in terms of forming groups.

If group scheduling is used, the PDSCH timing may be further extended by G which is the number of users schedulable by one UE.

In summary, when resources for Msg 2/3/4 are selected and determined implicitly for distribution as mentioned above, code or preamble index used in preamble transmission may be used. If preamble is transmitted using different subcarrier index (starting subcarrier index) with single tone preamble transmission, subcarrier index may also be used to determine the resource of Msg 2/3/4. More specifically, the resource may correspond to the time resource only where one PRB is used for one UE at a given moment or at a subframe. If subcarrier(s) can be allocated per each channel, the randomization/distribution of resources among multiple UEs may be applied to frequency domain as well.

Figure 7:
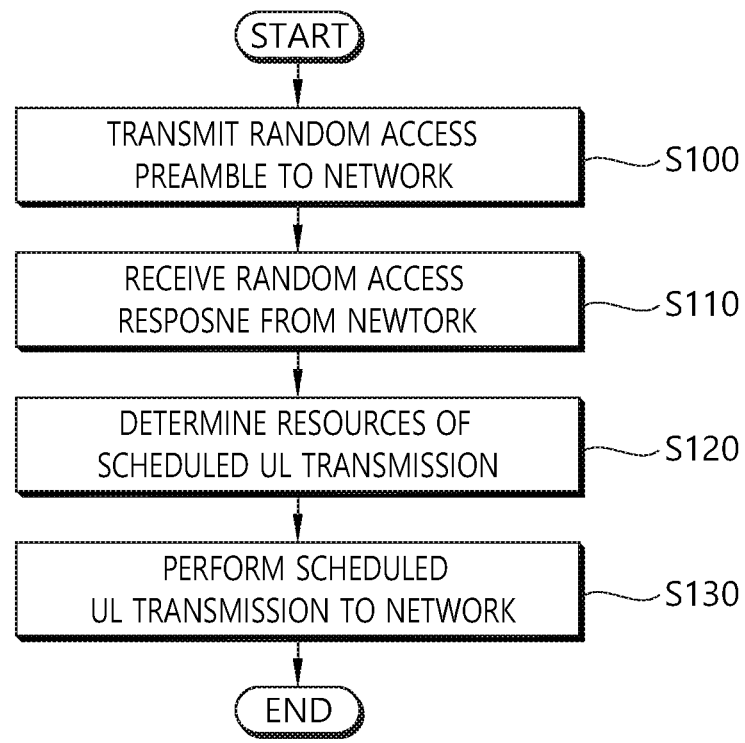
FIG. 7 shows a method for performing a random access procedure in an NB-IoT carrier according to an embodiment of the present invention.

FIG. 7 shows a method for performing a random access procedure in an NB-IoT carrier according to an embodiment of the present invention. The present invention described above may be applied to this embodiment of the present invention.

In step S100, the UE transmits a random access preamble to a network. In step S110, the UE receives a random access response from the network. In step S120, the UE determines resources of scheduled uplink (UL) transmission. In step S130, the UE performs the scheduled UL transmission to the network. A number of repetitions and a number of tones for the scheduled UL transmission may be determined by the random access preamble. The number of repetitions for the scheduled UL transmission may be different per coverage level. The number of tones for the scheduled UL transmission may be different per coverage level. Or, the number of tones for the scheduled UL transmission may be one.

The resources of the scheduled UL transmission may include a time resource of the scheduled UL transmission. The time resource of the scheduled UL transmission may be indicated by the random access response. Or, the time resource of the scheduled UL transmission may be determined based on a gap and an index of the random access response. Further, the resources of the scheduled UL transmission may include a frequency resource of the scheduled UL transmission. The frequency resource of the scheduled UL transmission may be indicated by the random access response. Or, the frequency resource of the scheduled UL transmission may be determined based on an index of the random access response.

4. ACK/NACK Resource Determination Corresponding to Msg 4 Transmission

ACK/NACK resource corresponding to Msg 4 transmission may be indicated in DCI. However, this may result in high DCI overhead. Accordingly, ACK/NACK resource corresponding to Msg 4 transmission may be implicitly determined. Based on the maximum R for PDSCH and maximum K, the ACK/NACK timing may start at R*K. The index used for DCI scheduling may be used to determine ACK/NACK timing. If group scheduling is used, expansion based on G (number of UEs schedulable by one group DCI) may be considered.

However, this approach may lead some power consumption, since a UE may be awaken longer between intermittent transmissions from control signal→data→ACK/NACK. Thus, depending on the scenario or coverage class, different periodicity and K value as well as G value may be configured.

The overall configuration may be given by SIB. To avoid collision between PUSCH and PUCCH transmission or between data and ACK/NACK transmission, the starting timing of ACK/NACK may be determined as (max (K1*R_PDSCH, K2*R_PUSCH)), where K1 and K2 are schedulable PDSCH/PUSCH within one window respectively, and R_PDSCH/R_PUSCH are the repetition numbers for both channels, respectively. For this, SIB may need to indicate preamble resource which then may determine the successive RAR/Msg 3 transmissions.

Figure 8:
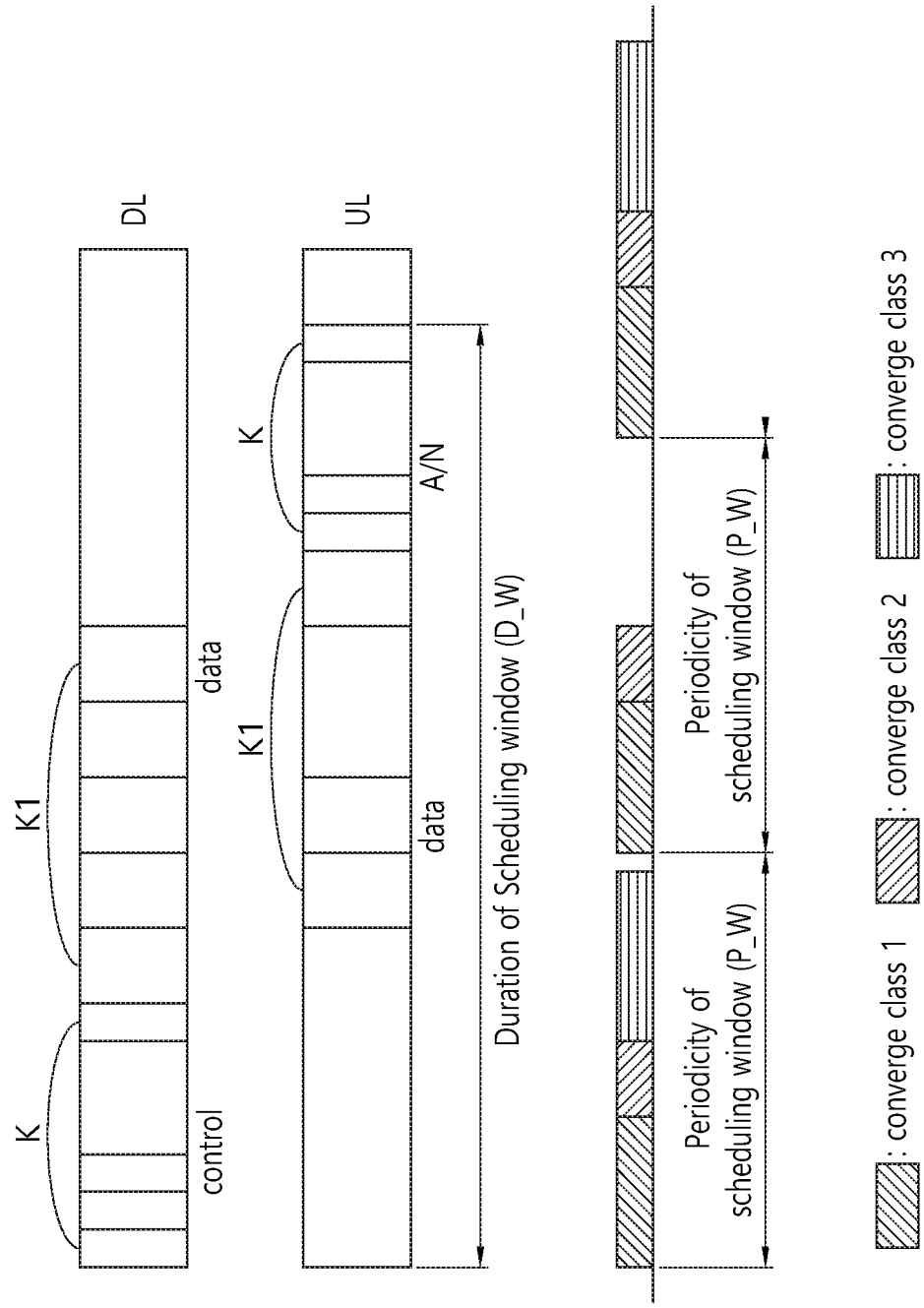
FIG. 8 shows an example of ACK/NACK transmission corresponding to Msg 4 transmission according to an embodiment of the present invention.

FIG. 8 shows an example of ACK/NACK transmission corresponding to Msg 4 transmission according to an embodiment of the present invention. FIG. 8 shows a potential timing of ACK/NACK transmission for scheduling unicast transmission. Referring to FIG. 8, the starting timing of ACK/NACK may be determined as (max (K1*R_PDSCH, K2*R_PUSCH)), where K1 and K2 are schedulable PDSCH/PUSCH within one window respectively, and R_PDSCH/R_PUSCH are the repetition numbers for both channels, respectively.

Figure 9:
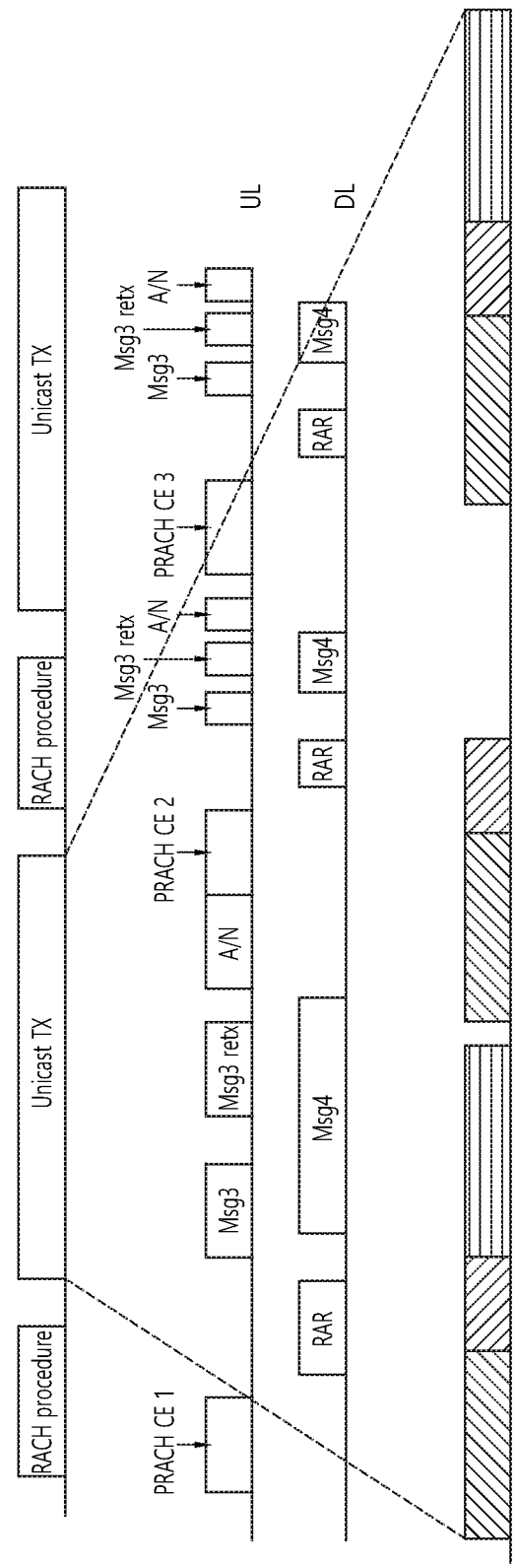
FIG. 9 shows another example of ACK/NACK transmission corresponding to Msg 4 transmission according to an embodiment of the present invention.

FIG. 9 shows another example of ACK/NACK transmission corresponding to Msg 4 transmission according to an embodiment of the present invention. FIG. 9 shows a case that resources for a random access procedure resources for unicast transmission are multiplexed by TDM.

If multiple NB-IoT carriers are available, the above operation may be determined by configuration of NB-IoT carrier and the PRACH resource configuration. This is similar to the concept where system bandwidth can be used for unicast transmission whereas only 6 PRBs are used for PRACH transmission in the legacy system. Since frequency resource is limited, multiplexing between PRACH and unicast transmission may takes time-division approach.

Figure 10:
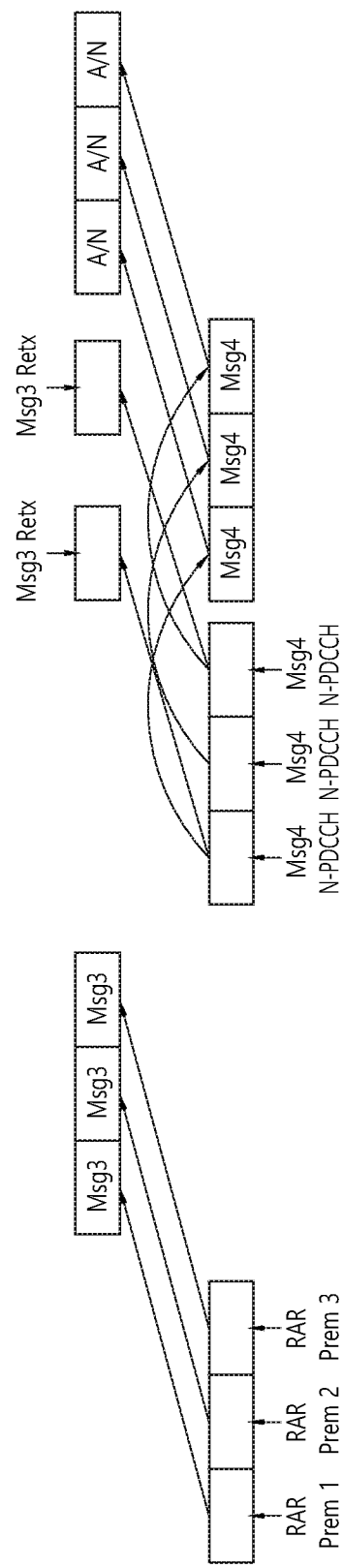
FIG. 10 shows an example of timing of messages of random access procedure in one NB-IoT carrier according to an embodiment of the present invention.

FIG. 10 shows an example of timing of messages of random access procedure in one NB-IoT carrier according to an embodiment of the present invention. If only one NB-IoT carrier is available, TDM among PRACH resources may be further necessary for different coverage class. Otherwise, different NB-IoT carrier may be used for different coverage class. Or, FDM within one carrier may also be considered. To handle paging, paging may be delivered along with system information or MIB or follow legacy paging occasion with extended paging occasion duration.

Figure 11:
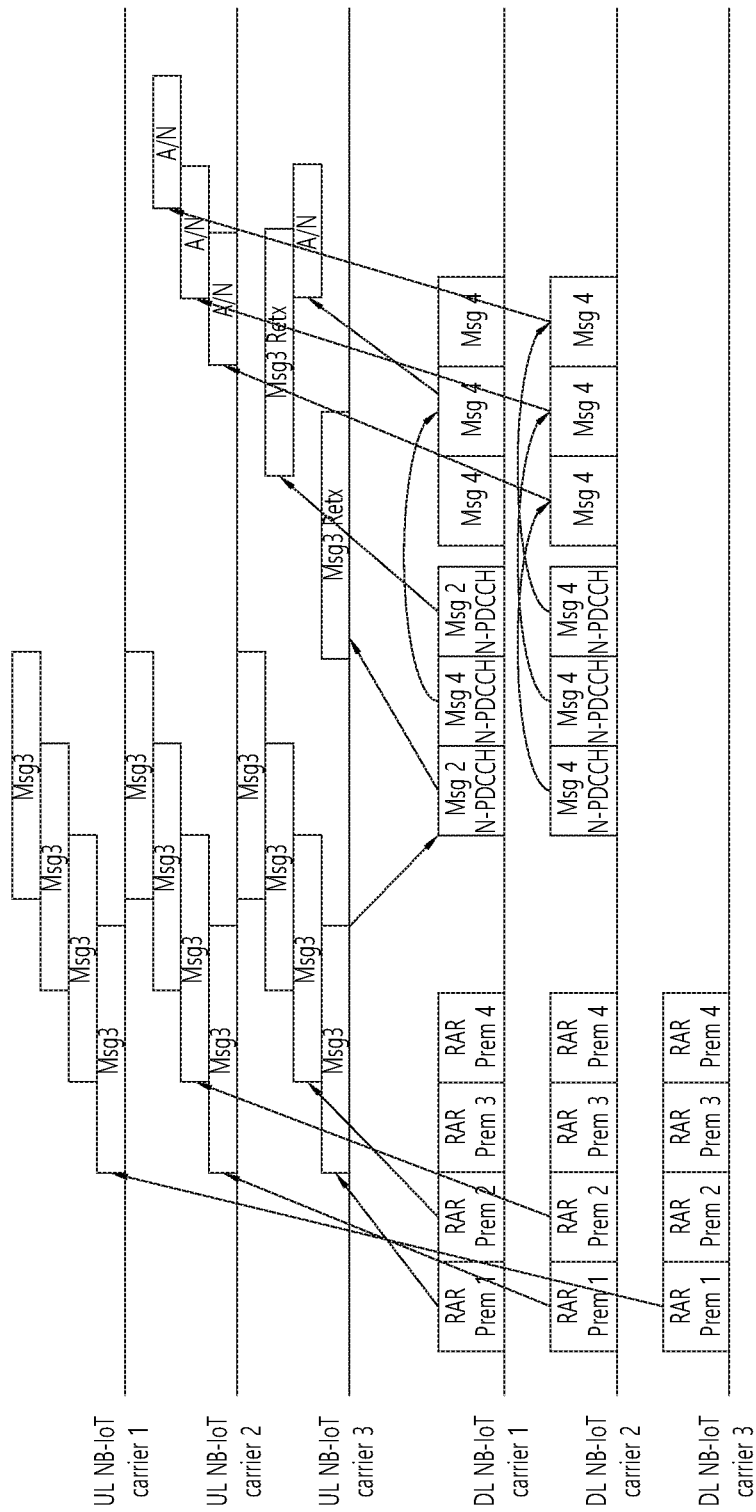
FIG. 11 shows an example of timing of messages of random access procedure in multiple NB-IoT carriers according to an embodiment of the present invention.

FIG. 11 shows an example of timing of messages of random access procedure in multiple NB-IoT carriers according to an embodiment of the present invention. Referring to FIG. 11, timing between two channels may be determined based on legacy timing, i.e. based on the end repetition of subframe of one channel and the starting subframe of the other channel. That is, timing may be determined by the last subframe of previous channel's repetition. Further, time resource index may be mapped to tone index, and carrier index may be mapped directly.

Figure 12:
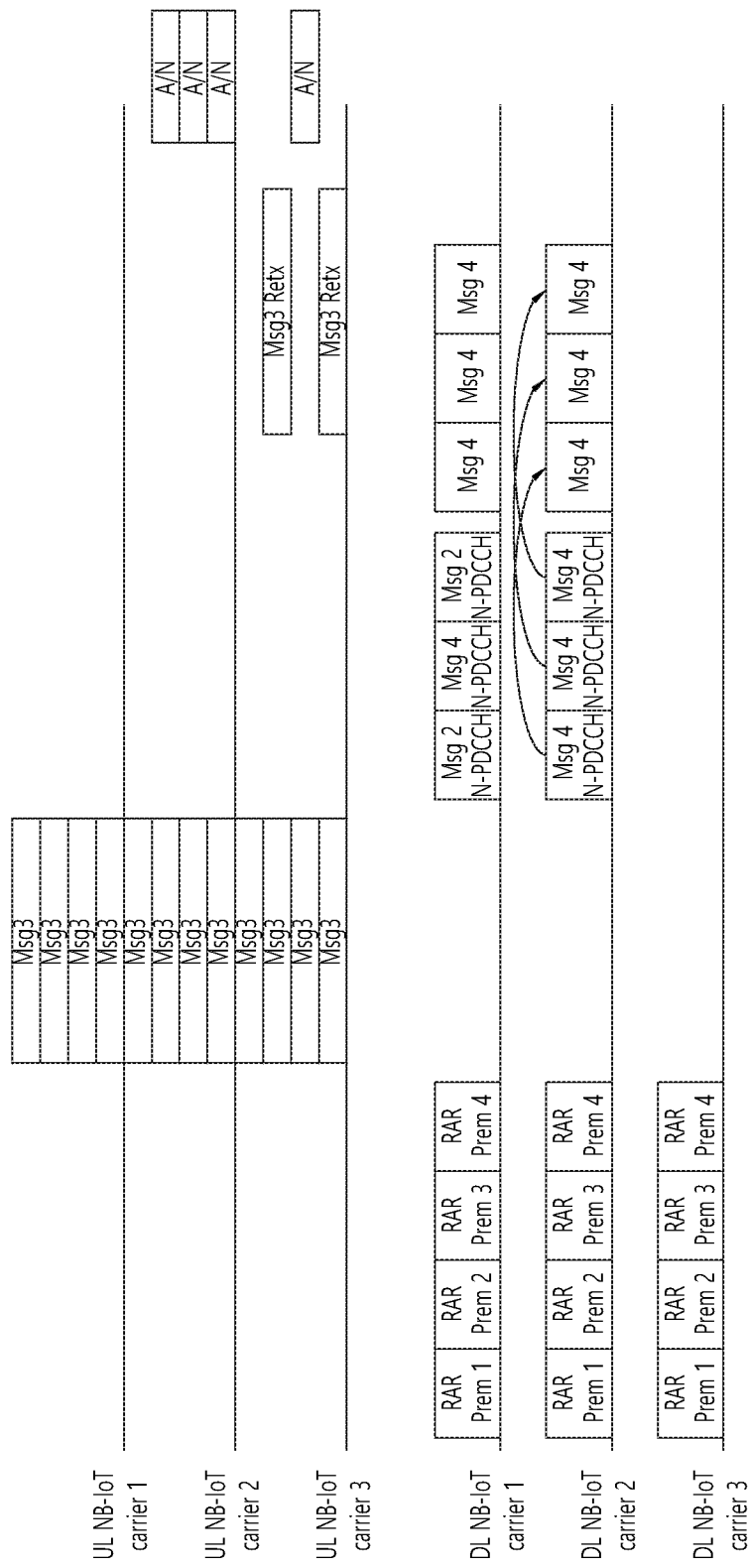
FIG. 12 shows another example of timing of messages of random access procedure in multiple NB-IoT carriers according to an embodiment of the present invention.

FIG. 12 shows another example of timing of messages of random access procedure in multiple NB-IoT carriers according to an embodiment of the present invention. Referring to FIG. 12, timing may be determined based on semi-statically configured resources. That is, timing may be determined by the last subframe of channel's resource. Further, time resource index may be mapped to tone index, and carrier index may be mapped directly.

To allow full flexibility, it is desired that tone index and NB-IoT carrier index are dynamically signaled in DCI. To minimize the overhead, one of tone index or NB-IoT carrier index may be dynamically signaled, and the other may be semi-statically configured or implicitly determined from previous transmissions. Further, some resources for each channel may be rather semi-statically configured, and which will then be used for multiple UEs based on UE ID or preamble index or some dynamic index or subcarrier index or resource used for precedent channel transmissions.

5. Configuration of Multiple NB-IoT Carriers

In stand-alone, guard band or in-band operations, multiple NB-IoT carriers may be used. For example, multiple NB-IoT carriers may be used for frequency hopping or other purposes. The set of NB-IoT carriers may be indicated to UEs. As NB-IoT carrier corresponds to one PRB in in-band operation, the possible location of NB-IoT carrier may be same as the number of PRBs in the system bandwidth. Accordingly, whether all PRBs are usable by NB-IoT carriers or not may need to be clarified as follows.

(1) In-band operation

All PRBs may be usable by NB-IoT UEs. In this case, the total number of NB-IoT carriers may be the same as the number of PRBs supported in the system bandwidth.

In addition to all PRBs, a set of PRBs in guard band may be usable. If NB-IoT carrier in guard band is used for synchronization and PBCH transmission, only PRBs within in-band may be usable for other transmissions.

Starting from the carrier where PSS/SSS/PBCH is transmitted, an offset+number of NB-IoT carriers may be configured. The offset may be used to determine a set of narrowbands. For example, starting from the PSS/SSS/PBCH carrier L, L+offset, L−offset, L+2*offset, L−2*offset up to L+m/2*offset, L−m/2*offset may be used for NB-IoT carriers. For this, signaling of offset and number may be necessary.

A set of NB-IoT carriers may be indicated via bitmap or via a table. Table 1 shows an example of a set of NB-IoT carriers.

TABLE 1

| 0 | (−10, −9, 0, 9, 10) |
|---|---|
| 1 | (−10, −8, 0, 8, 10) |
| 2 | (−8, 0, 8) |
| 3 | |
| 4 | |
| 5 | |

Further, different number of NB-IoT carriers and offsets may also be indicated in the table. It may be assumed that the exact PRB location where PSS/SSS/PBCH has been transmitted is known to the UE via configuration of offset between PSS/SSS PRB and the center frequency of the system bandwidth (may also require information about even/odd system bandwidth).

(2) Guard band operation: Index and frequency location may be configured. Or, index and offset from the center may be configured in PRB unit.

(3) Standalone operation: index and frequency location may be configured.

Guard band and in-band may be jointly used where guard band PSS/SSS/PBCH may indicate NB-IoT carriers of in-band and in-band PSS/SSS/PBCH may indicate NB-IoT carriers of guard band.

In NB-IoT, it is expected that the traffic is generally UL heavy. In that sense, allocating or reserving some resources only for ACK/NACK may not be so desirable. Accordingly, one channel type may carry different contents, such as data and control signal. For the convenience, this channel may be called NB-PUSCH. The characteristics of NB-PUSCH may be as follows.

Single tone to multiple tones may be supported. For example, single tone transmission may be supported, and only one tone may carry the information at a given moment.

Different subcarrier spacing: For example, 3.75 and 15 kHz subcarrier spacing may be considered.

Maximum 12 tones may be used for the transmission.

When multiple tones are scheduled or configured (more than one tone), subcarrier spacing may be 15 kHz.

6. Frame Structure for NB-IoT

In NB-IoT, L subcarriers (e.g. L=12) may exist in one NB-IoT carrier. L subcarriers may be divided into M frequency region (e.g. M=1, 2 or 4), and a UE may be scheduled with one or more frequency region. This frequency region may be called a narrowband resource element group (NB-REG). That is, one NB-REG is one RE group which can be allocated to one control channel or data channel. If M=1, NB-REG may be one legacy subframe. M may be preconfigured or configured per coverage class or configured per cell-specifically. One NB-may can be different between control and data channel. For example, for control channel, one NB-REG may consist of k subcarriers and 0.5 ms duration, and for data channel, one NB-REG may consist of k1 subcarriers and 1 ms duration. Control channel may be configured over one or multiple NB-REGs.

Narrowband subframe (NB-subframe) may be one unit where multiple UEs can be scheduled together. One NB-subframe may be prefixed to K ms or configured in SIB as a cell specific value. One NB-subframe may be configured per coverage class. One NB-subframe may be different per control and data channel or may be different per control and data channel per each coverage class or may be different between DL and UL per coverage class (or mode).

For control channel transmission, NB-REGs in P ms may be constructed by one of the followings options.

Figure 13:
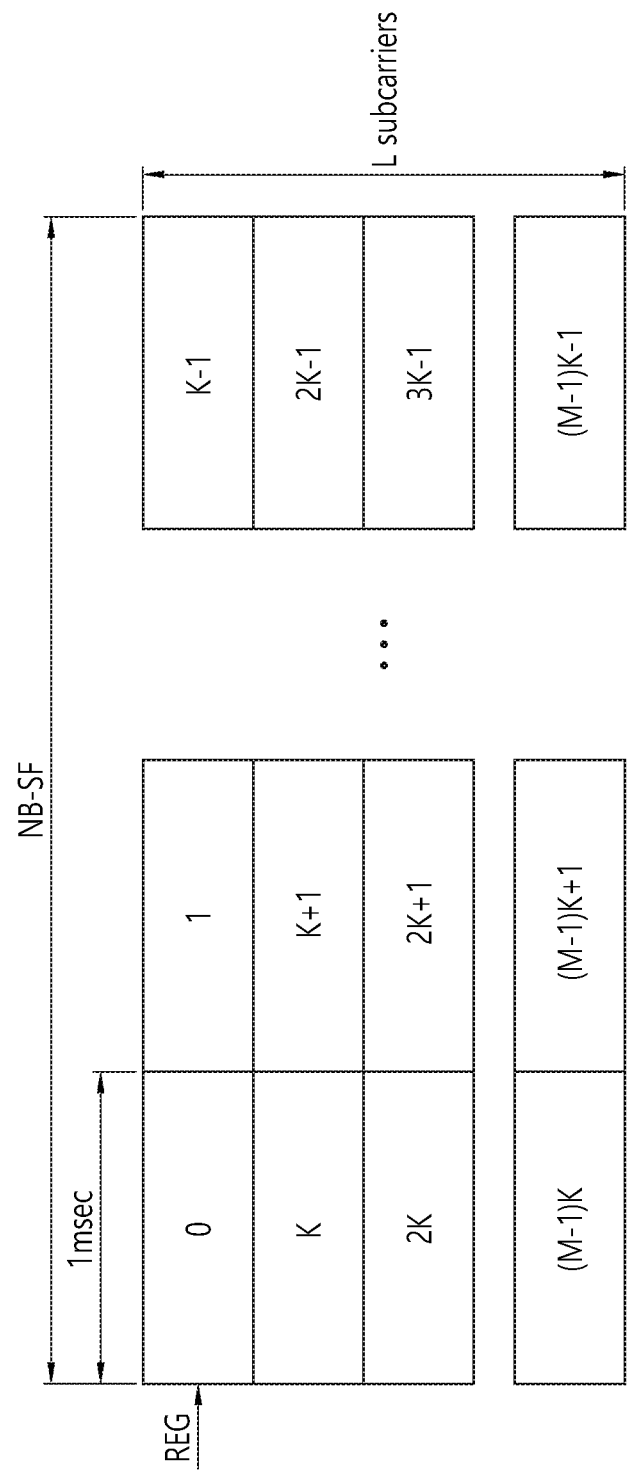
FIG. 13 shows an example of NB-REGs for NB-IoT according to an embodiment of the present invention.

FIG. 13 shows an example of NB-REGs for NB-IoT according to an embodiment of the present invention. Referring to FIG. 13, NB-REGs are indexed from 0 to (M−1)*K−1 in time domain first, and then in frequency domain. If multiple NB-REGs are used in frequency domain, this mapping may allow time-diversity if localized mapping is used. Both localized (i.e. one NB-CCE consists of continuous NB-REGs) or distributed mapping (or interleaved mapping i.e. one NB-CCE consists of discontinuous NB-REGs) may be considered.

Figure 14:
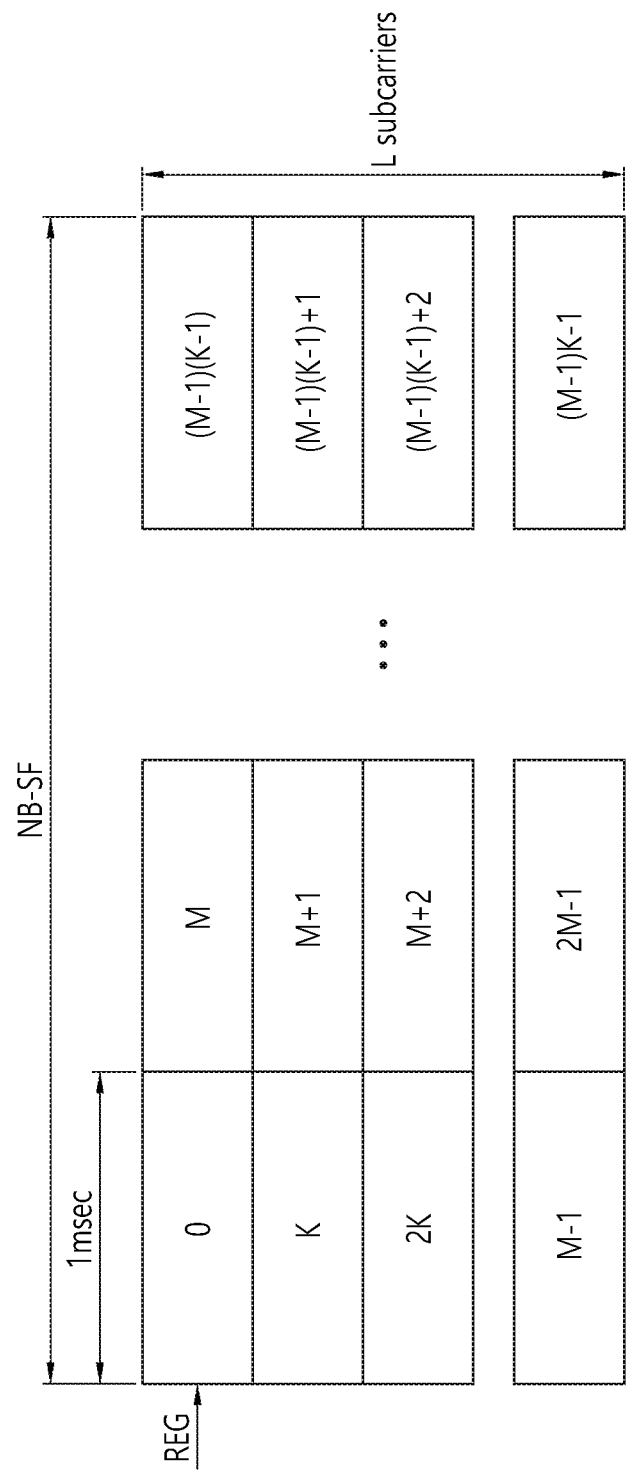
FIG. 14 shows another example of NB-REGs for NB-IoT according to an embodiment of the present invention.

FIG. 14 shows another example of NB-REGs for NB-IoT according to an embodiment of the present invention. Referring to FIG. 14, NB-REGs are indexed from 0 to (M−1)*K−1 in frequency domain first, and then in time domain.

If this mapping is used, a UE may be configured with the number of NB-REGs in frequency domain (or indices of REGs configured to a UE in frequency). For example, if 4 NB-REGs are configured in frequency domain, 4 bits may be used to indicate the used NB-REGs for a UE. This configuration may be given per coverage class or per control/data channel per each coverage class.

One NB-CCE may consist of N contiguous (for localized mapping) or discontinuous REGs (for distributed mapping). For example, N may be 4. A UE may blindly search multiple aggregation level where aggregation level is defined by the number of NB-CCEs.

Similarly, for data channel, a basic data channel element (DCE) may be indexed by either time-frequency (like FIG. 13) or frequency-time mapping (like FIG. 14). In total, M*K DCEs may be scheduled by an eNB.

If control and data channels are multiplexed in the same legacy subframe, the total value of K1 (K value for control channel) and K2 (K value for data channel) may be used in each resource mapping to construct CCE or DCE. A UE may be scheduled with 1 to M*K DCEs which will define TBS for a UE for data scheduling, and may be scheduled with M*K CCEs or maximum 8 or 16 REGs which will define aggregation level.

If multiple coverage class UEs or multiple groups of UEs are configured with different K, the formation or grouping of K in one time unit may be constructed by one of the following options.

Figure 15:
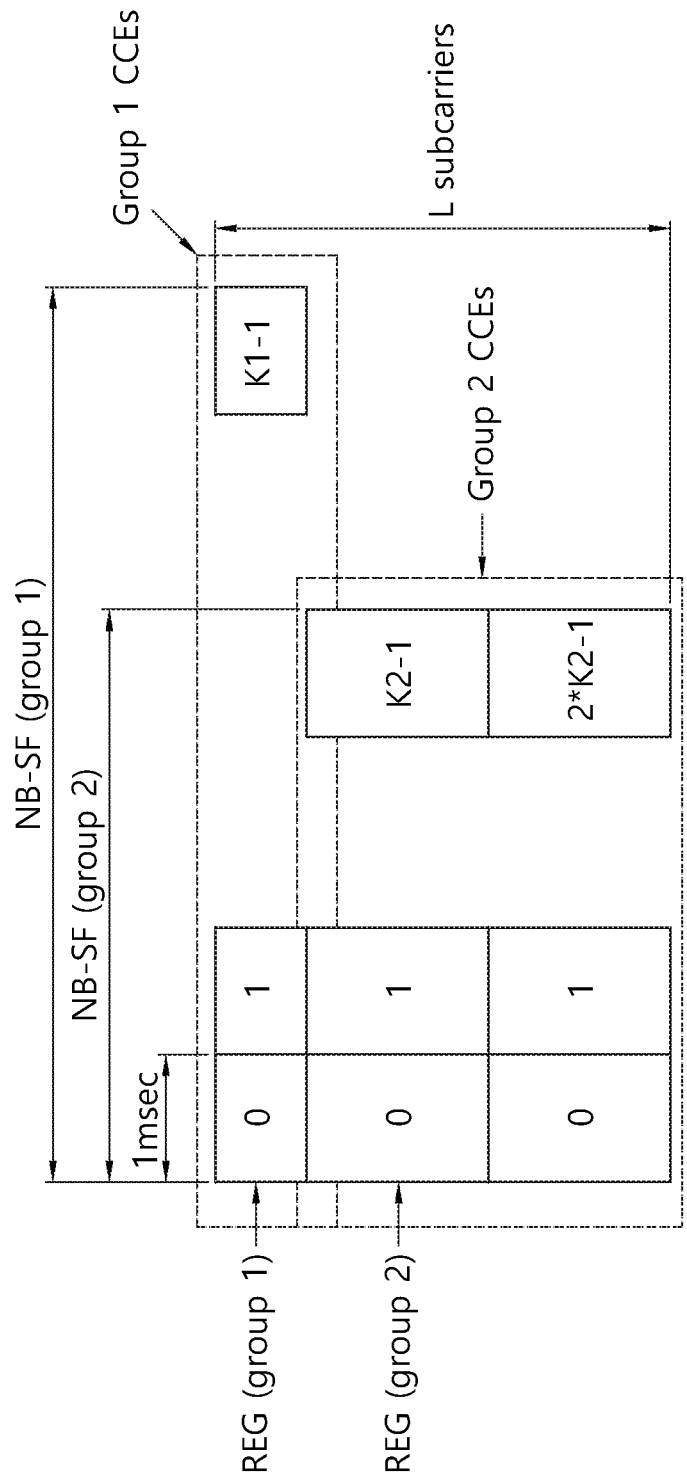
FIG. 15 shows an example of grouping of multiple UEs for NB-IoT according to an embodiment of the present invention.

FIG. 15 shows an example of grouping of multiple UEs for NB-IoT according to an embodiment of the present invention. Referring to FIG. 15, resources for each group of UEs are allocated disjoint, i.e. non-overlapped.

Figure 16:
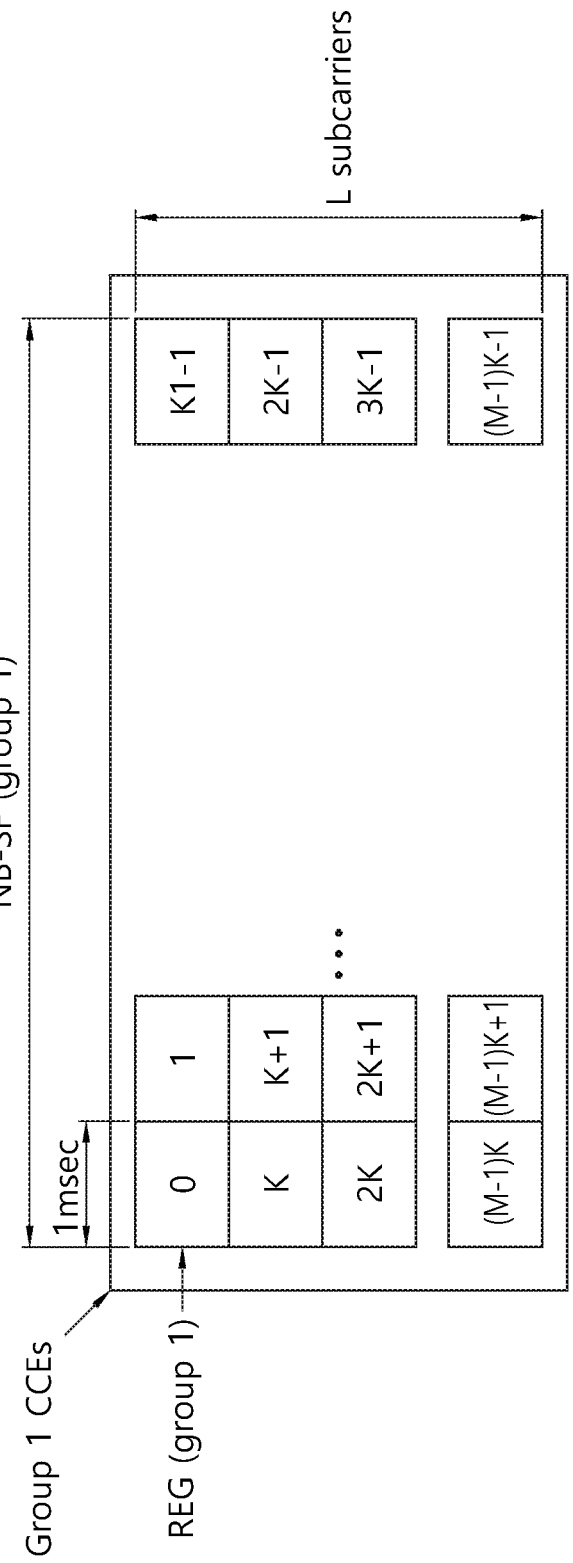
FIG. 16 and FIG. 17 show an example of grouping of multiple UEs for NB-IoT according to an embodiment of the present invention.
Figure 17:
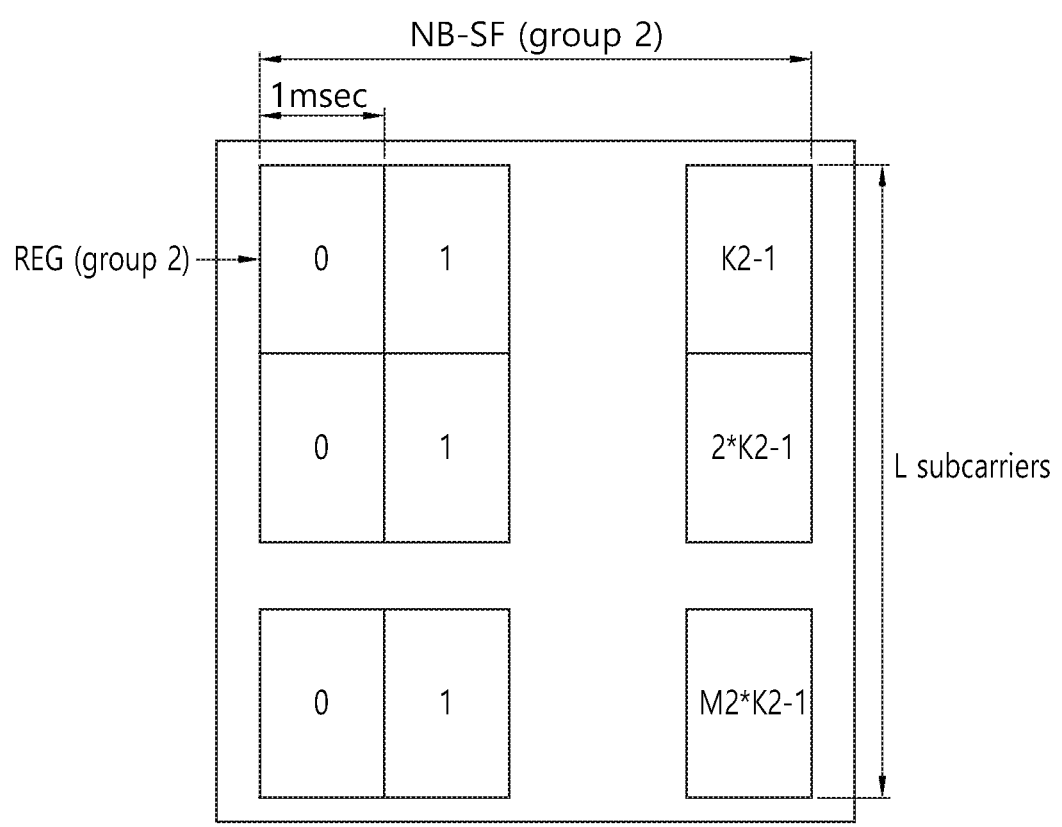

FIG. 16 and FIG. 17 show an example of grouping of multiple UEs for NB-IoT according to an embodiment of the present invention. Referring to FIG. 16 and FIG. 17, resources for each group of UEs are formed per each group of UEs as if there is only one group of UEs. FIG. 16 corresponds to resources for first group of UEs, and FIG. 17 corresponds to resources for second group of UEs. That is, virtual or overlapping mapping may be performed. Collision or scheduling conflict may be avoided by the network scheduling.

Further, NB-subframe may be used for any timing related configuration by the followings:

PDSCH: Since the last NB-subframe where NB-PDCCH is scheduled, the first NB-subframe for PDSCH after 4 ms may be the NB-subframe where PDSCH may be scheduled. If delay is used between NB-PDCCH and NB-PDSCH, the delay may be counted as the number NB-subframe for PDSCH.

NB-PUSCH: Similar to PDSCH, since the last NB-subframe where NB-PDCCH is scheduled, the first NB-subframe for PUSCH after 4 ms may be the first NB-subframe where PUSCH can be scheduled.

Figure 18:
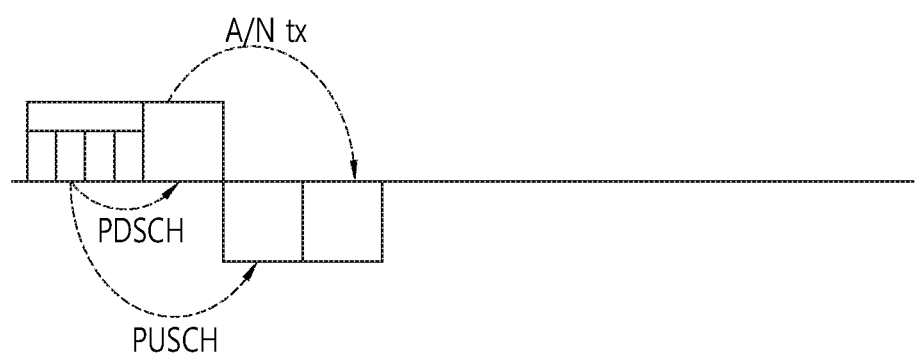
FIG. 18 shows an example of timing between channels for NB-IoT according to an embodiment of the present invention.

FIG. 18 shows an example of timing between channels for NB-IoT according to an embodiment of the present invention. The size of K may be a cell-common value, and timing may be multiple of K. For example, referring to FIG. 18, if K is larger than 4, the timing between any channels may be always 1 (i.e. PDSCH is the next NB-subframe since NB-PDCCH, PUSCH is n+2 since NB-PDCCH at NB-subframe n, ACK/NACK transmission is n+2 since NB-PUSCH at NB-subframe n.

In terms of scheduling, a number of DCEs may be scheduled via compact resource allocation where starting DCE and length can be jointly scheduled.

In terms of CRS/data scrambling over a subframe, sequence scrambling may occur over every NB-subframe. Within NB-subframe, a random sequence may be mapped over different DCEs based on DCE index (or CCE index). Alternatively, CRS/data scrambling may occur over a legacy subframe. A legacy PRB index can be used in in-band operation, and a PRB index may be allocated via cell specific or higher layer signaling in guard band and stand-alone operation.

For CRS/data scrambling or sequence mapping, a set of legacy subframes within NB-subframe may be used as PRBs in a legacy system or index from 0 to K−1. However, as it may have dependency between different OFDM symbols over time, a legacy CRS sequence mapped within one PRB may be used. However, in terms of data scrambling, it may work in NB-subframe level (i.e. same NB-subframe scrambling over one control or data within NB-SF).

If NB-subframe is used, a UE may be required to be able to receive NB-subframe for one TB, where decoding latency can be relaxed to NB-subframe.

When single tone is used, some basic concept of resource unit may be necessary. For example, one resource unit may be ceil (12/k)*k subcarriers. Alternatively, one resource unit may be determined as (single tone*12 subframes) or (single carrier*m subframes). Two types of resource unit may be as follows. Since it's likely that more tones will be used in DL transmission compared to UL transmission, the duration which defines one resource unit in DL and UL may be different from each other. For example, if 15 kHz is used with single tone transmission, for DL, it may be assumed that 1 ms or k ms is used as one resource unit or [12/k] ms with k tones are used for one resource unit or [12/k]*m ms with k subcarriers are used as one resource unit. For example, when 3.75 kHz is used in UL transmission, the duration may become 4 times longer which consists one TTI or one resource unit.

If timing is defined, when different size of TTI length is used in DL and UL, one of the following options may be considered.

(1) Regardless of TTI length of DL or UL, legacy TTI of 1 ms may always be used. For example, to transmit X channel corresponding to Y precedent channel, legacy TTI of 1 ms may be counted regardless of resource unit of X or Y. The issue with this option is that the timing may not be aligned with the starting of resource unit of X. Thus, if this option is used, the first available resource unit for X may be used for X transmission instead of instantaneous start of X transmission. Even this option is used, the timing may be based on the resource unit, if dynamic signaling or semi-static configuration of offset is used. For example, if PUSCH is scheduled with offset o, the transmission of PUSCH of k+o*m may be delayed, where k is the timing between UL grant and PUSCH and m is the duration of one resource unit used for PUSCH transmission. In other words, only for timing determination for processing may be based on legacy TTI.

(2) If multiple legacy TTIs forms one resource unit or TTI for NB-IoT, it is generally also desirable to relax processing requirement to one resource unit size. For example, if one TTI for NB-IoT in DL is 6 ms, it may be generally good to extend the processing time to 6 ms to further reflex UE requirements. In this case, in terms of determining processing time or timing between channels, depending on DL channel or UL channel, the processing time may be different. For example, if cross-TTI scheduling is used in DL, 1 resource unit may be assumed between control and data channel since the last transmission of control channel repetition or last subframe of control channel resource unit where control channel can be transmitted. For PUSCH, since UL grant needs to be processed, one DL TTI size may be added after the last subframe of control channel (same as data case), and 2 UL TTIs may be allowed, i.e. one for UL encoding and processing and the other for timing advance and other processing. For example, if DL TTI size is 4 ms and UL TTI size is 6 ms, totally it will consume 4+12=16 ms since the last subframe of control channel (actual transmission or resource unit or monitoring occasion). However, the latency may also depend on the amount of data that a UE has to process. If the data size does not exceed 1 PRB (legacy PRB) even with increased TTI size, overall processing time of 1 ms unit may be assumed as in the option (1) above.

If some processing relaxation is used, it may add the relaxed latency component. For example, if data decoding is relaxed from 1 ms to m msec, the latency between PDSCH to ACK/NACK transmission may be relaxed by k+(m−1) to accommodate processing time relaxation. When resource unit is defined per each channel, the starting time may be the first available resource unit with the consideration of processing time required. One exception case may be the TTI length with different subcarrier spacing in DL and UL. In such a case, regardless of processing time relaxation, 4 times (or 4 ms) TTI size in UL may be assumed compared to DL. Alternatively, it may follow LTE legacy TTI length for processing time computation.

Further, different from legacy subframe index, some new index may be used per resource unit.

In terms of scrambling, etc., one resource unit may be treated as one TTI such that one scrambling is used over the entire duration of one resource unit.

Further, resource allocation/scheduling may be done at basic resource unit. For example, resource block in DL may be 12 subcarrier*1 ms, and resource block in UL may be k subcarrier*12/k*15/subcarrier spacing ms.

The resource units may be rather semi-statically configured or predefined such that only a few frequency resources are indicated by dynamic signaling. In terms of scheduling, at least one the followings may indicated:

The number of tones used: one of {1, 3, 6, 12} or {1, 4, 8, 12}

The number of TTIs or repetitions

The frequency location: one of {0, 1, 2, 3} where a set of frequency locations per each number of tones are semi-statically configured.

Further, the number of tones and frequency location may be joint-signaled. For example, 12 subcarriers may be divided into {0, [1-3], [4-10], 11, [0-11], [1-6], [7-10], reserved} with 3 bits. If this is used, a set of tones may be prefixed or semi-statically configured in 1 PRB or 12 subcarriers with 15 kHz subcarrier spacing. For 3.75 kHz subcarrier spacing, some additional bit to indicate subcarrier spacing for single tone may be used or some other types as the followings can be considered, e.g. {[0, 15 kHz], [0, 3.75 kHz], [1-3], [4-10], [11, 15 kHz], [11, 37.5 kHz], [0-11]}.

Alternatively, 3.75 kHz and 15 kHz subcarrier spacing may be used in a TDM manner and the duration and periodicity of either 3.75 kHz or 15 kHz may be configured. When 15 kHz subcarrier spacing is used, multi-tone transmission may also be used in the same period. When 3.75 kHz subcarrier spacing is used, multiple subcarriers with single tone transmission may be used with 3.75 kHz subcarrier spacing. In this case, some UEs supporting only 3.75 kHz subcarrier spacing may be scheduled or transmitted only in period where 3.75 kHz is used. From a UE perspective, subcarrier spacing may be dynamically signaled by UL grant. Meanwhile, to change the subcarrier spacing, it may require more processing time. If TDM is used, it will wait until the first available duration where the configured/indicated subcarrier spacing is configured. If TDM is used, depending on the UL grant timing (corresponding PUSCH timing), the same value may be determined differently. If 3.75 kHz subcarrier spacing is used, the index may be used for indicating subcarrier or tone index. If 15 kHz subcarrier spacing is used, the index may indicate the number of tones and the frequency resource.

In terms of signaling TDM between different subcarrier spacing, at least one of the following options may be considered.

(1) Period, duration or offset of each subcarrier spacing may be signaled. For example, {3.75 kHz, 100 ms, 50 ms, 0}, {15 kHz, 100 ms, 50 ms, 50} may be used for configuration of TDM.

(2) If a UE supports only one subcarrier spacing, non-supported subcarrier duration may be considered as invalid UL subframes where transmissions will be postponed or dropped. Extending this, the configuration may be given as valid UL subframe configuration format as well.

(3) In terms of selected subcarrier spacing, it may follow subcarrier or the number of tones used for Msg 3 transmission (scheduled by UL grant or determined by PRACH transmission or PRACH coverage level or PRACH repetition level or PRAH format).

Figure 19:
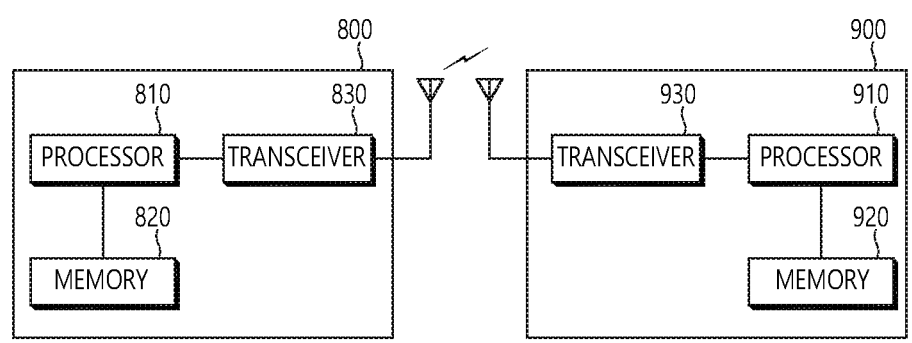
FIG. 19 shows a wireless communication system to implement an embodiment of the present invention.

FIG. 19 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A NB-IoT UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing a random access procedure in a narrowband internet-of-things (NB-IoT) carrier in a wireless communication system, the method comprising:
   transmitting a random access preamble to a network;
   receiving a random access response from the network, wherein the random access response includes information on available tones and starting subframe of a scheduled uplink (UL) transmission;
   determining a plurality of tones of the scheduled UL transmission within the available tones, based on an index of the random access preamble; and
   performing the scheduled UL transmission to the network from the starting subframe on the plurality of tones,
   wherein a number of the plurality of tones is determined based on coverage level of the UE,
   wherein resources of the scheduled UL transmission include a time resource of the scheduled UL transmission, and
   wherein the time resource of the scheduled UL transmission is determined based on a gap value (g) and the index of the random access response (i), where the scheduled UL transmission is calculated by (g*i)+4.

2. The method of claim 1, wherein the number of tones for the scheduled UL transmission is one.

3. The method of claim 1, wherein the time resource of the scheduled UL transmission is indicated by the random access response.

4. The method of claim 1, wherein a frequency resource of the scheduled UL transmission is determined based on an index of the random access response.

5. A user equipment (UE) in a wireless communication system, the UE comprising:
   a memory;
   a transceiver; and
   a processor, coupled to the memory and the transceiver, that:
   controls the transceiver to transmit a random access preamble to a network,
   controls the transceiver to receive a random access response from the network, wherein the random access response includes information on available tones and starting subframe of a scheduled uplink (UL) transmission, determines a plurality of tones of the scheduled UL transmission within the available tones, based on an index of the random access preamble, and controls the transceiver to perform the scheduled UL transmission to the network from the starting subframe on the plurality of tones, wherein a number of the plurality of tones is determined based on coverage level of the UE, wherein resources of the scheduled UL transmission include a time resource of the scheduled UL transmission, and wherein the time resource of the scheduled UL transmission is determined based on a gap value (g) and the index of the random access response (i), where the scheduled UL transmission is calculated by (g*i)+4.

* * * * *